US009590890B2

(12) United States Patent
Shibata et al.

(10) Patent No.: US 9,590,890 B2
(45) Date of Patent: Mar. 7, 2017

(54) TRANSFER APPARATUS, SERVER, AND ROUTE CHANGING METHOD

(71) Applicant: HITACHI, LTD., Tokyo (JP)

(72) Inventors: Takeshi Shibata, Tokyo (JP); Makoto Kitani, Tokyo (JP); Toshiaki Suzuki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 159 days.

(21) Appl. No.: 14/551,740

(22) Filed: Nov. 24, 2014

(65) Prior Publication Data
US 2015/0146525 A1    May 28, 2015

(30) Foreign Application Priority Data

Nov. 27, 2013 (JP) .................................. 2013-244825

(51) Int. Cl.
*H04L 12/721* (2013.01)
*H04L 12/707* (2013.01)

(52) U.S. Cl.
CPC ............ *H04L 45/123* (2013.01); *H04L 45/22* (2013.01)

(58) Field of Classification Search
None
See application file for complete search history.

(56) References Cited

U.S. PATENT DOCUMENTS 7,861,003 B2 * 12/2010 Mallesan ................ H04L 45/00
709/238
9,100,907 B2 * 8/2015 Liu ......................... H04L 45/14
9,219,650 B2 * 12/2015 Sakata .................... H04L 41/00
2007/0086429 A1    4/2007 Lawrence et al.
2013/0031244 A1    1/2013 Zhang et al.
2013/0121178 A1 * 5/2013 Mainaud ............... H04W 40/12
370/252

FOREIGN PATENT DOCUMENTS

EP         1587262 A2   10/2005
JP      2006-148497 A    6/2006

OTHER PUBLICATIONS

Extended European Search Report received in corresponding European Application No. 1419490.7 dated Apr. 2, 2015.

* cited by examiner

*Primary Examiner* — Xavier Szewai Wong
(74) *Attorney, Agent, or Firm* — Mattingly & Malur, PC

(57) ABSTRACT

A transfer apparatus is configured to: calculate a total cost of a first route in a first network that starts from a source transfer apparatus and ends at a destination transfer apparatus; obtain a particular cost being a cost between the source transfer apparatus and a first line, which couples the source transfer apparatus and its own transfer apparatus, in a second route, which starts from the source transfer apparatus and reaches the destination transfer apparatus via its own transfer apparatus; calculate a differential between the total cost and the particular cost; set, based on the differential, a cost between its own transfer apparatus and a second line, which couples its own transfer apparatus and the destination transfer apparatus, to a value that causes the source transfer apparatus to select the second route rather than the first route; and notify the cost value to the source transfer apparatus.

9 Claims, 22 Drawing Sheets

| FROM \ TO | Ne1 | Ne2 | Ne3 | Nr1 | Nr2 | Le1 | Le2 | Le3 | Lr1 | Lr2 | Lr3 | Lr4 | Lr5 |
|---|---|---|---|---|---|---|---|---|---|---|---|---|---|
| Ne1 | | | | | | 0 | | | 0 | | | | |
| Ne2 | | | | | | | 0 | | | 0 | | | |
| Ne3 | | | | | | | | 0 | | | 0 | | |
| Nr1 | 100 | | | | | | | | | | | 0 | |
| Nr2 | | 100 | | | | | | | | | | | 0 |
| Le1 | 100 | | | | | | | | 0 | | | | |
| Le2 | | 100 | | 100 | | | | | | 0 | | | |
| Le3 | | 100 | 100 | | | | | | | | 0 | | |
| Lr1 | | | | | 100 | | | | | | | | |
| Lr2 | | 100 | | 100 | | | | | | | | | |
| Lr3 | | 100 | 100 | | | | | | | | | | |
| Lr4 | | | 100 | | 100 | | | | | | | | |
| Lr5 | | | | 100 | 100 | | | | | | | | |

ROUTE TABLE OF EDGE NODE Ne1         RT1

| DESTINATION | NETMASK | NEXT HOP | PRIORITY |
|---|---|---|---|
| NETWORK OF USER NODE Nu1 | /24 | Nu1 | 1 |
| NETWORK OF USER NODE Nu2 | /24 | Nr1 | 20 |
| NETWORK OF USER NODE Nu3 | /24 | Nr1 | 30 |

Fig. 4B

ROUTE TABLE OF EDGE NODE Ne2         RT2

| DESTINATION | NETMASK | NEXT HOP | PRIORITY |
|---|---|---|---|
| NETWORK OF USER NODE Nu1 | /24 | Nr1 | 20 |
|  |  | Nr2 | 30 |
| NETWORK OF USER NODE Nu2 | /24 | Nu2 | 1 |
| NETWORK OF USER NODE Nu3 | /24 | Nr2 | 20 |
|  |  | Nr1 | 30 |

Fig. 4C

ROUTE TABLE OF EDGE NODE Ne3         RT3

| DESTINATION | NETMASK | NEXT HOP | PRIORITY |
|---|---|---|---|
| NETWORK OF USER NODE Nu1 | /24 | Nr2 | 30 |
| NETWORK OF USER NODE Nu2 | /24 | Nr2 | 20 |
| NETWORK OF USER NODE Nu3 | /24 | Nu3 | 1 |

| TO 501 | FROM 502 | TOTAL COST 503 | INGRESS COST 504 | DIFFERENCE 505 | MIN COST 506 |
|---|---|---|---|---|---|
| EDGE NODE Ne1 | EDGE NOD Ne2 | 200 | 100 | 100 | 100 |
| | EDGE NOD Ne3 | 300 | 100 | 200 | |
| EDGE NODE Ne2 | EDGE NOD Ne1 | 200 | 100 | 100 | 100 |
| | EDGE NOD Ne3 | 200 | 100 | 100 | |
| EDGE NODE Ne3 | EDGE NOD Ne1 | 300 | 100 | 200 | 100 |
| | EDGE NOD Ne2 | 200 | 100 | 100 | |

Fig. 9

| FROM\TO | Ne1 | Ne2 | Ne3 | Nr1 | Nr2 | Nn | Le1 | Le2 | Le3 | Lr1 | Lr2 | Lr3 | Lr4 | Lr5 | Ln1 | Ln2 | Ln3 |
|---|---|---|---|---|---|---|---|---|---|---|---|---|---|---|---|---|---|
| Ne1 | | | | | | | | | | | | | | | | | |
| Ne2 | 100 | | | | | | | | | | | | | | | | |
| Ne3 | | 100 | | | | | | | | | | | | | | | |
| Nr1 | | | 100 | | | | | | | | | | | | | | |
| Nr2 | | | 100 | | | | | | | | | | | | | | |
| Nn | | | | | | | | | | | | | | | | | |
| Le1 | 100 | | | | | | 0 | | | 0 | | | | | 0 | | |
| Le2 | | 100 | | | | | | 0 | | | 0 | | | | | 0 | |
| Le3 | | | 100 | | | | | | 0 | | | 0 | | | | | 0 |
| Lr1 | 100 | | | | | | | | | 0 | 0 | | | | | | |
| Lr2 | | 100 | | | | | | | | 0 | 0 | | | | | | |
| Lr3 | | | | 100 | 100 | | | | | | | 0 | 0 | | | | |
| Lr4 | | | | 100 | 100 | | | | | | | | 0 | 0 | | | |
| Lr5 | | | | 100 | 100 | | | | | | | | | 0 | | | |
| Ln1 | 100 | | | | | 8 | | | | | | | | | 0 | | |
| Ln2 | | 100 | | | | 8 | | | | | | | | | | 0 | |
| Ln3 | | | 100 | | | 8 | | | | | | | | | | | 0 |

ROUTE TABLE OF NEW NODE Nn    RT4

| DESTINATION | NETMASK | NEXT HOP | PRIORITY |
| --- | --- | --- | --- |
| NETWORK OF USER1 | /24 | | |
| NETWORK OF USER2 | /24 | | |
| NETWORK OF USER3 | /24 | | |

Fig. 11

| FROM\TO | Ne1 | Ne2 | Ne3 | Nr1 | Nr2 | Nn | Le1 | Le2 | Le3 | Lr1 | Lr2 | Lr3 | Lr4 | Lr5 | Ln1 | Ln2 | Ln3 |
|---|---|---|---|---|---|---|---|---|---|---|---|---|---|---|---|---|---|
| Ne1 |  |  |  |  |  |  | 0 |  |  | 0 |  |  |  |  | 0 |  |  |
| Ne2 | 100 |  |  |  |  |  |  | 0 |  |  | 0 |  |  |  |  | 0 |  |
| Ne3 |  |  |  |  |  |  |  |  | 0 |  |  | 0 |  |  |  |  | 0 |
| Nr1 |  | 100 |  |  |  |  |  |  |  | 0 |  |  | 0 | 0 |  |  |  |
| Nr2 |  |  |  | 100 |  |  |  |  |  |  | 0 | 0 | 0 | 0 |  |  |  |
| Nn |  |  |  |  |  |  |  |  |  |  |  |  |  |  | 0 | 0 | 0 |
| Le1 | 100 |  |  |  |  |  |  |  |  |  |  |  |  |  |  |  |  |
| Le2 |  | 100 |  |  |  |  |  |  |  |  |  |  |  |  |  |  |  |
| Le3 |  |  | 100 |  |  |  |  |  |  |  |  |  |  |  |  |  |  |
| Lr1 | 100 |  |  |  |  |  |  |  |  |  |  |  |  |  |  |  |  |
| Lr2 |  | 100 |  |  |  |  |  |  |  |  |  |  |  |  |  |  |  |
| Lr3 |  | 100 | 100 |  |  |  |  |  |  |  |  |  |  |  |  |  |  |
| Lr4 |  |  |  | 100 | 100 |  |  |  |  |  |  |  |  |  |  |  |  |
| Lr5 |  |  |  | 100 | 100 |  |  |  |  |  |  |  |  |  |  |  |  |
| Ln1 | 100 |  |  |  |  | 50 |  |  |  |  |  |  |  |  |  |  |  |
| Ln2 |  | 100 |  |  |  | ∞ |  |  |  |  |  |  |  |  |  |  |  |
| Ln3 |  |  | 100 |  |  | ∞ |  |  |  |  |  |  |  |  |  |  |  |

ROUTE TABLE OF EDGE NODE Ne2 — RT2

| DESTINATION | NETMASK | NEXT HOP | PRIORITY |
|---|---|---|---|
| NETWORK OF USER NODE Nu1 | /24 | Nn | 15 |
| | | Nr1 | 20 |
| | | Nr2 | 30 |
| NETWORK OF USER NODE Nu2 | /24 | Nu2 | 1 |
| NETWORK OF USER NODE Nu3 | /24 | Nr2 | 20 |
| | | Nr1 | 30 |

Fig. 12B

ROUTE TABLE OF EDGE NODE Ne3 — RT3

| DESTINATION | NETMASK | NEXT HOP | PRIORITY |
|---|---|---|---|
| NETWORK OF USER NODE Nu1 | /24 | Nn | 15 |
| | | Nr2 | 30 |
| NETWORK OF USER NODE Nu2 | /24 | Nr2 | 20 |
| NETWORK OF USER NODE Nu3 | /24 | Nu3 | 1 |

Fig. 12C

ROUTE TABLE OF NEW NODE Nn — RT4

| DESTINATION | NETMASK | NEXT HOP | PRIORITY |
|---|---|---|---|
| NETWORK OF USER1 | /24 | Ne1 | 5 |
| NETWORK OF USER2 | /24 | Ne1 | 25 |
| NETWORK OF USER3 | /24 | Ne1 | 35 |

Fig. 13

| FROM\TO | Ne1 | Ne2 | Ne3 | Nr1 | Nr2 | Nn | Le1 | Le2 | Le3 | Lr1 | Lr2 | Lr3 | Lr4 | Lr5 | Ln1 | Ln2 | Ln3 |
|---|---|---|---|---|---|---|---|---|---|---|---|---|---|---|---|---|---|
| Ne1 |  |  |  |  |  |  | 0 |  |  | 0 |  |  |  |  | 0 |  |  |
| Ne2 |  |  |  |  |  |  |  | 0 |  |  | 0 |  |  |  |  | 0 |  |
| Ne3 |  |  |  |  |  |  |  |  | 0 |  |  | 0 |  |  |  |  | 0 |
| Nr1 |  |  |  |  |  |  |  |  |  | 0 |  | 0 |  |  |  |  |  |
| Nr2 |  |  |  |  |  |  |  |  |  |  | 0 |  | 0 |  |  |  |  |
| Nn |  |  |  |  |  |  |  |  |  |  |  |  | 0 | 0 | 0 | 0 | 0 |
| Le1 | 100 |  |  |  |  |  |  |  |  |  |  |  |  |  |  |  |  |
| Le2 |  | 100 |  |  |  |  |  |  |  |  |  |  |  |  |  |  |  |
| Le3 |  |  | 100 |  |  |  |  |  |  |  |  |  |  |  |  |  |  |
| Lr1 | 100 |  |  |  |  |  |  |  |  |  |  |  |  |  |  |  |  |
| Lr2 |  | 100 |  | 100 |  |  |  |  |  |  |  |  |  |  |  |  |  |
| Lr3 |  | 100 | 100 | 100 | 100 |  |  |  |  |  |  |  |  |  |  |  |  |
| Lr4 |  |  | 100 |  | 100 |  |  |  |  |  |  |  |  |  |  |  |  |
| Lr5 |  |  |  | 100 | 100 |  |  |  |  |  |  |  |  |  |  |  |  |
| Ln1 | 100 |  |  |  |  | 50 |  |  |  |  |  |  |  |  |  |  |  |
| Ln2 |  | 100 |  |  |  | 50 |  |  |  |  |  |  |  |  |  |  |  |
| Ln3 |  |  | 100 |  |  | ∞ |  |  |  |  |  |  |  |  |  |  |  |

ROUTE TABLE OF EDGE NODE Ne1　　RT1

| DESTINATION | NETMASK | NEXT HOP | PRIORITY |
|---|---|---|---|
| NETWORK OF USER NODE Nu1 | /24 | Nu1 | 1 |
| NETWORK OF USER NODE Nu2 | /24 | Nn | 15 |
| | | Nr1 | 20 |
| NETWORK OF USER NODE Nu3 | /24 | Nr1 | 30 |

Fig. 14B

ROUTE TABLE OF EDGE NODE Ne3　　RT3

| DESTINATION | NETMASK | NEXT HOP | PRIORITY |
|---|---|---|---|
| NETWORK OF USER NODE Nu1 | /24 | Nn | 15 |
| | | Nr2 | 30 |
| NETWORK OF USER NODE Nu2 | /24 | Nn | 15 |
| | | Nr2 | 20 |
| NETWORK OF USER NODE Nu3 | /24 | Nu3 | 1 |

Fig. 14C

ROUTE TABLE OF NEW NODE Nn　　RT4

| DESTINATION | NETMASK | NEXT HOP | PRIORITY |
|---|---|---|---|
| NETWORK OF USER1 | /24 | Ne1 | 5 |
| | | Ne2 | 25 |
| NETWORK OF USER2 | /24 | Ne2 | 5 |
| | | Ne1 | 25 |
| NETWORK OF USER3 | /24 | Ne2 | 25 |
| | | Ne1 | 35 |

Fig. 15

| FROM / TO | Ne1 | Ne2 | Ne3 | Nr1 | Nr2 | Nn | Le1 | Le2 | Le3 | Lr1 | Lr2 | Lr3 | Lr4 | Lr5 | Ln1 | Ln2 | Ln3 |
|---|---|---|---|---|---|---|---|---|---|---|---|---|---|---|---|---|---|
| Ne1 |  |  |  |  |  |  |  |  |  |  |  |  |  |  |  |  |  |
| Ne2 |  |  |  |  |  |  |  |  |  |  |  |  |  |  |  |  |  |
| Ne3 |  |  |  |  |  |  |  |  |  |  |  |  |  |  |  |  |  |
| Nr1 |  |  |  |  |  |  |  |  |  |  |  |  |  |  |  |  |  |
| Nr2 |  |  |  |  |  |  |  |  |  |  |  |  |  |  |  |  |  |
| Nn |  |  |  |  |  |  |  |  |  |  |  |  |  |  |  |  |  |
| Le1 | 100 |  |  |  |  |  | 0 |  |  |  |  |  |  |  |  |  |  |
| Le2 |  | 100 |  |  |  |  |  | 0 |  |  |  |  |  |  |  |  |  |
| Le3 |  |  | 100 |  |  |  |  |  | 0 |  |  |  |  |  |  |  |  |
| Lr1 | 100 |  |  |  |  |  | 0 |  |  | 0 |  |  |  |  |  |  |  |
| Lr2 |  | 100 |  | 100 |  |  |  | 0 |  |  | 0 |  |  |  |  |  |  |
| Lr3 |  | 100 | 100 | 100 | 100 |  |  |  | 0 |  |  | 0 |  |  |  |  |  |
| Lr4 |  |  | 100 |  | 100 |  |  |  |  |  |  | 0 | 0 |  |  |  |  |
| Lr5 |  |  |  | 100 | 100 |  |  |  |  |  |  |  | 0 | 0 |  |  |  |
| Ln1 | 100 |  |  |  |  | 50 |  |  |  |  |  |  | 0 |  | 0 |  |  |
| Ln2 |  | 100 |  |  |  | 50 |  |  |  |  |  |  |  | 0 |  | 0 |  |
| Ln3 |  |  | 100 |  |  | 50 |  |  |  |  |  |  |  | 0 |  |  | 0 |

ROUTE TABLE OF EDGE NODE Ne1 — RT1

| DESTINATION | NETMASK | NEXT HOP | PRIORITY |
|---|---|---|---|
| NETWORK OF USER NODE Nu1 | /24 | Nu1 | 1 |
| NETWORK OF USER NODE Nu2 | /24 | Nn | 15 |
|  |  | Nr1 | 20 |
| NETWORK OF USER NODE Nu3 | /24 | Nn | 15 |
|  |  | Nr1 | 30 |

Fig. 16B

ROUTE TABLE OF EDGE NODE Ne2 — RT2

| DESTINATION | NETMASK | NEXT HOP | PRIORITY |
|---|---|---|---|
| NETWORK OF USER NODE Nu1 | /24 | Nn | 15 |
|  |  | Nr1 | 20 |
|  |  | Nr2 | 30 |
| NETWORK OF USER NODE Nu2 | /24 | Nu2 | 1 |
| NETWORK OF USER NODE Nu3 | /24 | Nn | 15 |
|  |  | Nr2 | 20 |
|  |  | Nr1 | 30 |

Fig. 16C

ROUTE TABLE OF NEW NODE Nn  RT4

| DESTINATION | NETMASK | NEXT HOP | PRIORITY |
| --- | --- | --- | --- |
| NETWORK OF USER1 | /24 | Ne1 | 5 |
| | | Ne2 | 25 |
| | | Ne3 | 35 |
| NETWORK OF USER2 | /24 | Ne2 | 5 |
| | | Ne1 | 25 |
| | | Ne3 | 25 |
| NETWORK OF USER3 | /24 | Ne3 | 5 |
| | | Ne2 | 25 |
| | | Ne1 | 35 |

Fig. 19

| 501 | 502 | 503 | 504 | 505 | 506 | 1901 | 1902 | 1903 |
|---|---|---|---|---|---|---|---|---|
| TO | FROM | TOTAL COST | INGRESS COST | DIFFERENCE | MAX COST | LSP | BANDWIDTH | PRIORITY |
| EDGE NODE Ne1 | EDGE NODE Ne2 | 200 | 100 | 100 | 100 | LSP1 | 10 | 10 |
| | | | | | | LSP2 | 20 | 10 |
| | EDGE NODE Ne3 | 300 | 100 | 200 | | LSP3 | 30 | 10 |
| EDGE NODE Ne2 | EDGE NODE Ne1 | 200 | 100 | 100 | 100 | LSP4 | 10 | 10 |
| | | | | | | LSP5 | 10 | 20 |
| | EDGE NODE Ne3 | 200 | 100 | 100 | | LSP6 | 20 | 30 |
| EDGE NODE Ne3 | EDGE NODE Ne2 | 300 | 100 | 200 | 100 | LSP7 | 10 | 10 |
| | | | | | | LSP8 | 20 | 20 |
| | EDGE NODE Ne2 | 200 | 100 | 100 | | LSP9 | 10 | 30 |

| 501 TO | 502 FROM | 503 TOTAL COST | 504 INGRESS COST | 505 DIFFERENCE | 2100 AREA | 506 MIN COST |
|---|---|---|---|---|---|---|
| EDGE NODE Ne1 | BOUNDARY NODE Nb1 | 200 | 100 | 100 | 1 | 100 |
| EDGE NODE Ne2 | BOUNDARY NODE Nb2 | 200 | 100 | 100 | 3 | 100 |
| BOUNDARY NODE Nb1 | EDGE NODE Ne1 | 200 | 100 | 100 | 1 | 100 |
| | BOUNDARY NODE Nb2 | 200 | 100 | 100 | 2 | 100 |
| BOUNDARY NODE Nb2 | EDGE NODE Ne2 | 200 | 100 | 100 | 3 | 100 |
| | BOUNDARY NODE Nb1 | 200 | 100 | 100 | 2 | 100 |

500

TRANSFER APPARATUS, SERVER, AND ROUTE CHANGING METHOD

CLAIM OF PRIORITY

The present application claims priority from Japanese patent application JP 2013-244825 filed on Nov. 27, 2013, the content of which is hereby incorporated by reference into this application.

BACKGROUND OF THE INVENTION

This invention relates to a transfer apparatus for transferring data, a server, and a route changing method.

There has hitherto been a communication route changing method in which planes (communication routes) are switched/returned to their original roles during a network failure or network maintenance (JP 2006-148497 A). In this communication route changing method, a communication system includes a first router and a second router, which constitute one virtual router protocol group and which can both dynamically change from an active router to a standby router, or from a standby router to an active router. When a first port of the first router is opened to hold communication to and from a first device and a second port of the second router, which is coupled so as to be capable of communication to and from the first device, is closed, the communication system opens the second port, which is higher in priority as a virtual router than the first port and which is lower in evaluation value as a communication route to and from the first device than the first port.

The migration of a communication network that includes transfer apparatus to a new communication network requires the migration of services that have been performed in the existing communication network to the new communication network. JP 2006-148497 A described above does not consider a migration to a new communication network. Control load therefore increases as the switching of communication networks takes place, which makes control of the communication networks unstable in the migration of services.

SUMMARY OF THE INVENTION

It is an object of this invention to reduce the load of controlling communication networks, which is incurred by the migration of services.

An aspect of the invention disclosed in this application is a transfer apparatus to be coupled to a first network having a configuration in which a cost required for data transfer is set to each of lines coupling the transfer apparatus to other transfer apparatus, and data is transferred along a route that has been set based on a sum of the costs, the transfer apparatus comprising: a processor for executing programs; and a memory for storing the programs, wherein the processor executes: first calculation processing of calculating a total cost of a first route in the first network that starts from a source transfer apparatus and ends at a destination transfer apparatus; obtaining processing of obtaining a particular cost, the particular cost being a cost between the source transfer apparatus and a first line, which couples the source transfer apparatus and its own transfer apparatus, in a second route, which starts from the source transfer apparatus and reaches the destination transfer apparatus via its own transfer apparatus; second calculation processing of calculating a differential between the total cost calculated in the first calculation processing and the particular cost obtained in the obtaining processing; setting processing of setting, based on the differential calculated in the second calculation processing, a cost between its own transfer apparatus and a second line, which couples its own transfer apparatus and the destination transfer apparatus, to a value that causes the source transfer apparatus to select the second route rather than the first route; and notification processing of notifying the cost value set in the setting processing to the source transfer apparatus. According to the exemplary embodiment of this invention, the load of controlling communication networks, which is incurred by the migration of services can be reduced. Other objects, configurations, and effects than those described above are clarified by the following description of an embodiment.

BRIEF DESCRIPTION OF THE DRAWINGS

FIG. 4A is a table showing an example of what is stored in the route table created and held by the edge node Ne1 which is denoted by RT1.

FIG. 4B is a table showing an example of what is stored in the route table created and held by the edge node Ne2 which is denoted by RT2.

FIG. 4C is a table showing an example of what is stored in the route table created and held by the edge node Ne3 which is denoted by RT3.

FIG. 5 is a table showing an example of what is stored in a cost management table.

FIG. 9 is a table showing an example of what is stored in the link information table that is built in Step S802.

FIG. 10 is a table showing an example of what is stored in the route table of the new node that is built in Step S802.

FIG. 11 is a table showing an example of what is stored in the link information table after the update in Step S803.

FIG. 12A is a table showing an example of what is stored in the route table after the update in Step S805A.

FIG. 12B is a table showing an example of what is stored in the route table after the update in Step S805B.

FIG. 12C is a table showing an example of what is stored in the route table after the update in Step S805B.

FIG. 13 is a table showing an example of what is stored in the link information table after the update in Step S806.

FIG. 14A is a table showing an example of what is stored in the route table after the update in Step S808A.

FIG. 14B is a table showing an example of what is stored in the route table after the update in Step S808B.

FIG. 14C is a table showing an example of what is stored in the route table after the update in Step S808B.

FIG. 15 is a table showing an example of what is stored in the link information table after the update in Step S809.

FIG. 16A is a table showing an example of what is stored in the route table after the update in Step S811A.

FIG. 16B is a table showing an example of what is stored in the route table after the update in Step S811B.

FIG. 16C is a table showing an example of what is stored in the route table after the update in Step S811B.

FIG. 19 is a table showing an example of what is stored in the cost management table according to the third embodiment.

FIG. 21 is a table showing an example of what is stored in the cost management table according to the fourth embodiment.

DETAILED DESCRIPTION OF THE PREFERRED EMBODIMENTS

Figure 1:
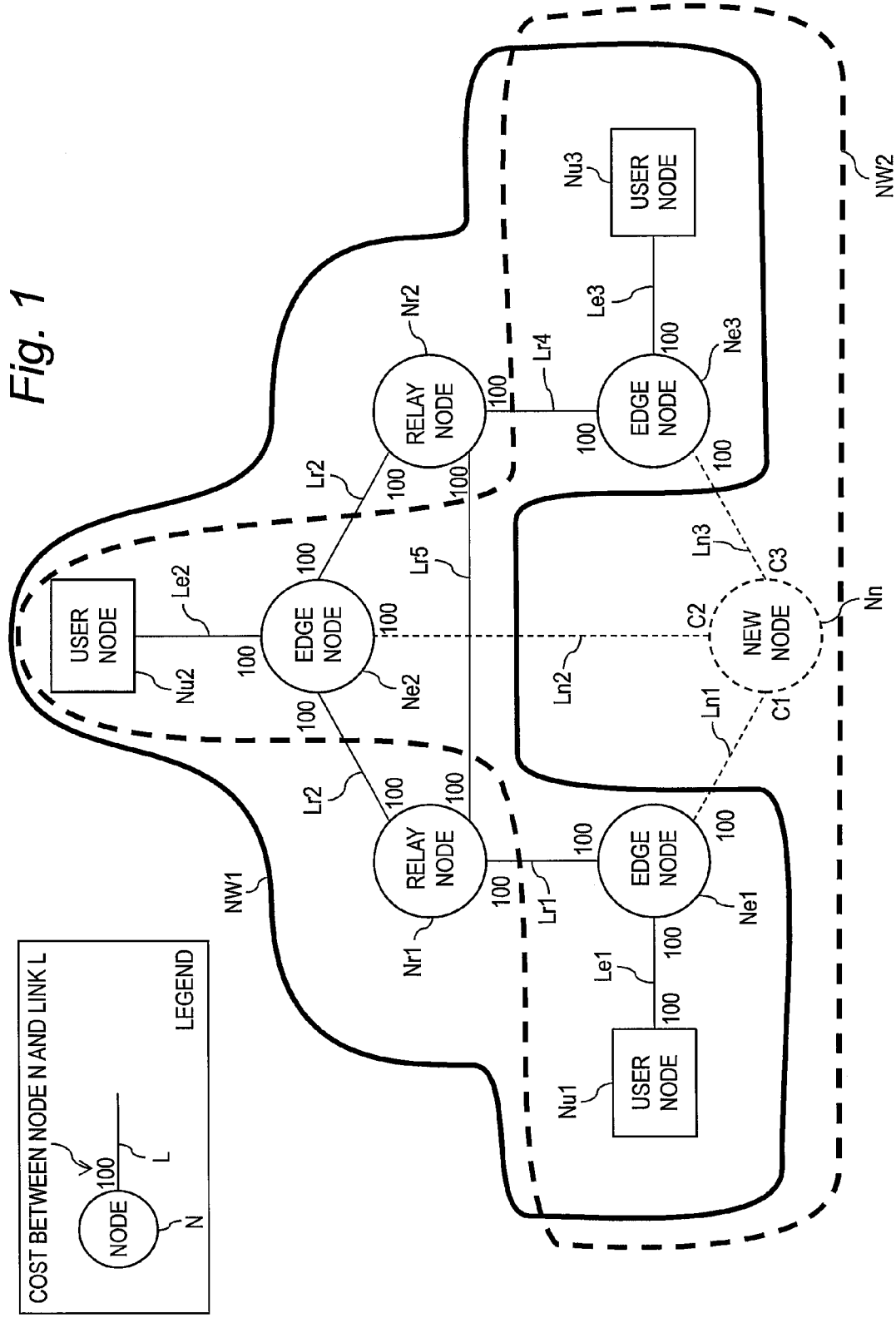
FIG. 1 is an explanatory diagram illustrating a system configuration example of a communication system according to a first embodiment of this invention.

A detailed description is now given of embodiments of this invention referring to the drawings. Substantially the same components are denoted by the same reference numerals, and a description thereof is therefore omitted.

First Embodiment

System Configuration Example

FIG. 1 is an explanatory diagram illustrating a system configuration example of a communication system according to a first embodiment of this invention. The communication system is a system in which a plurality of nodes as transfer apparatus for transferring data are coupled in a manner that allows communication to and from one another, and constitutes a network NW1. The nodes include user nodes Nu# (# represents a numeral), edge nodes Ne#, relay nodes Nr#, and new nodes Nn. Those nodes are collectively referred to as nodes N.

The edge nodes Ne# and the relay nodes Nr# are collectively referred to as edge nodes Ne and relay nodes Nr, respectively. The solid lines and dotted lines between the nodes N represent lines for transporting data, which are also referred to as links. The links include links Le# between the edge nodes Ne and the user nodes Nu, links Lr# between the relay nodes Nr and the edge nodes Ne, links Lr# between the relay nodes Nr, links (not shown) between the edge nodes Ne, and links Ln# between the edge nodes Ne and the new nodes Nn. Those links are collectively referred to as links L. The links Le#, the links Lr#, and the links Ln# are collectively referred to as links Le, links Lr, and links Ln, respectively.

The user nodes Nu are the nodes N that transmit and receive data, for example, terminals or servers. There may be networks (not shown) under the user nodes Nu. The edge nodes Ne are the nodes N that are coupled directly to the user Nodes Nu to transfer data from the user nodes Nu, and to transfer data from other nodes N to the user nodes Nu. The relay nodes Nr are the nodes N that are coupled between the edge nodes Ne to transfer data from one edge node Ne to the other edge node Ne. The new nodes Nn are the nodes N that are newly installed in the network. In this example, one new node Nn is installed in place of the relay nodes Nr1 and Nr2 to constitute a network NW2.

In the first embodiment, the networks NW1 and NW2 are both present after the new node Nn is newly installed, and then the relay nodes Nr1 and Nr2 are removed. The migration from the network NW1 to the network NW2 is executed in stages in this manner.

A numerical value "100" written in FIG. 1 at a point where one link L and one node N are coupled to each other is a cost value required for data transfer between the link L and the node N. The cost indicates a priority level at which the link is used for data transfer, and is determined by, for example, the bandwidth of the link. A smaller cost value is set for a wider bandwidth. In the first embodiment, the cost value is "100" for every link.

<Configuration Example of Each Node N>

Figure 2:
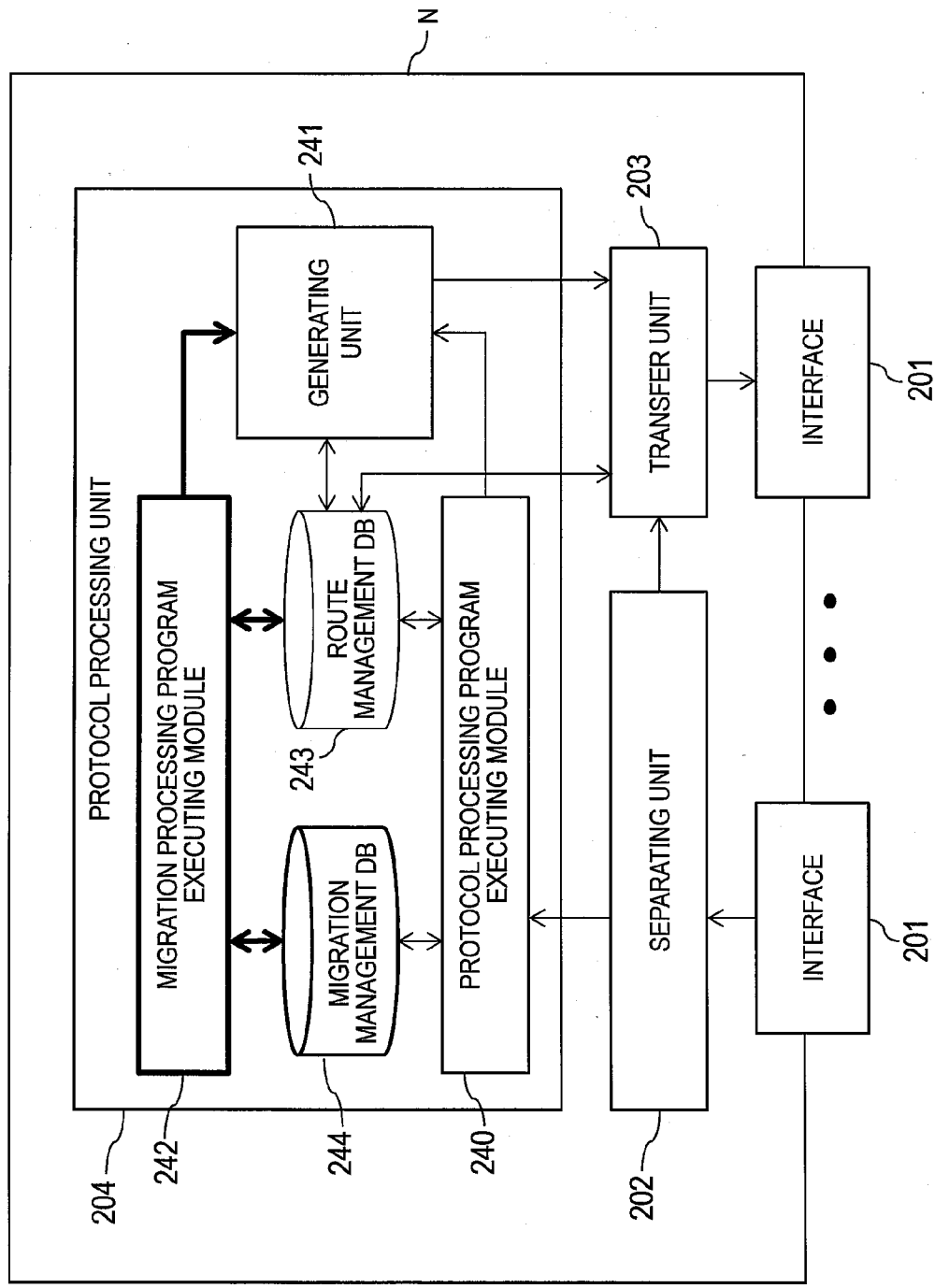
FIG. 2 is a block diagram illustrating a configuration example of each node N according to the first embodiment.

FIG. 2 is a block diagram illustrating a configuration example of each node N according to the first embodiment. Each node N includes a plurality of interfaces 201, a separating unit 202, a transfer unit 203, and a protocol processing unit 204.

The interfaces 201 are coupled to other nodes N via the links L to transmit and receive data.

The separating unit 202 determines whether a packet received from the interface 201 that is connected to another node N is a protocol packet or a data packet. A protocol packet is a control packet that contains, for example, link identification information of a link that couples to the source node N, and a cost value related to the link. The separating unit 202 outputs the received packet to the transfer unit 203 when the received packet is a data packet, and outputs the received packet to the protocol processing unit 204 when the received packet is a protocol packet.

The transfer unit 203 refers to a route table within a route management DB to identify a node that is the transmission destination of the data packet from the separating unit 202, and outputs the data packet to the relevant interface 201 with the transmission destination node specified. The route table is described later. The interface 201 transmits the packet from a port that is coupled to the specified transmission destination node N.

The protocol processing unit 204 includes a protocol processing program executing module 240, a generating unit 241, a migration processing program executing module 242, a route management DB 243, and a migration management DB 244.

The protocol processing program executing module 240 executes a protocol processing program when a protocol packet is received. To give a concrete example, when receiving a protocol packet, the protocol processing program executing module 240 uses information contained in the protocol packet to create a link information table and the route table, and stores the tables in the route management DB 243. The link information table and the route table are described later.

The generating unit 241 generates a protocol packet at given timing. Specifically, the generating unit 241 generates a protocol packet for every given length of time, for example. The generating unit 241 generates a protocol packet also when a protocol packet from another node N is received. The generating unit 241 refers to the link information table and the route table to generate a protocol packet that contains link identification information of a link that couples to its own node N and a cost value related to the link. The generated protocol packet is output to the transfer unit 203.

The migration processing program executing module 242 executes a migration processing program. To give a concrete example, the migration processing program executing module 242 refers to the link information table to create or update a migration management table, and stores the migration management table in the migration management DB 244. The specifics of the execution by the migration processing program executing module 242 and details of the migration management table are described later.

The protocol processing program executing module 240 implements its function by controlling a processor (not shown) to execute the protocol processing program, which is stored in a memory (not shown). Similarly, the migration processing program executing module 242 implements its function by controlling the processor (not shown) to execute the migration processing program, which is stored in the memory (not shown).

<Example of Information Stored in the Link Information Table>

Figure 3:
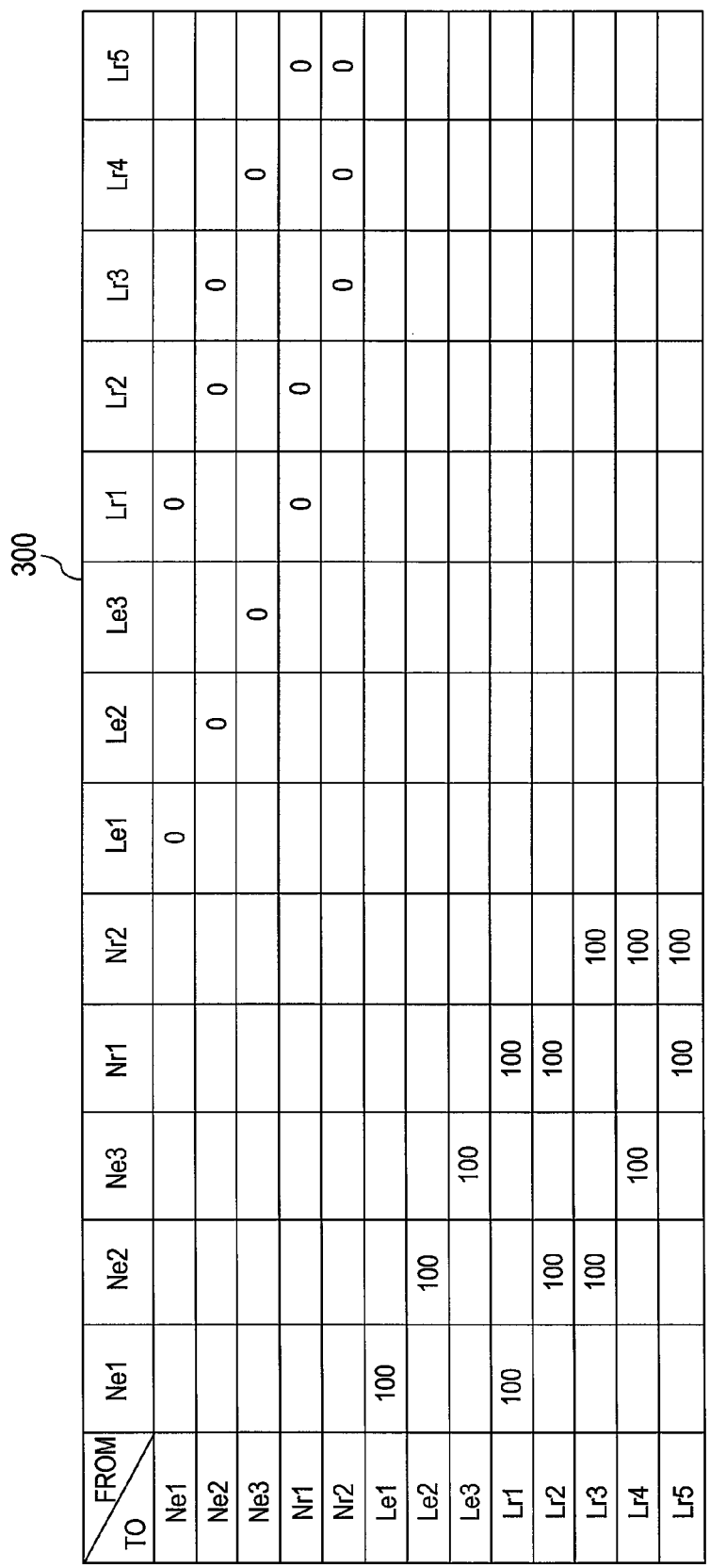
FIG. 3 is a table showing an example of what is stored in the link information table.

FIG. 3 is a table showing an example of what is stored in the link information table. The link information table, which is denoted by 300, is a table that defines a coupling relation and a cost value between the nodes N, for example, a link state database created by a link state protocol such as Open Shortest Path First (OSPF). In each node N, the link information table 300 is created by the protocol processing program, and is stored in the route management DB 243.

The link information table 300 is a matrix made up of "To" rows and "From" columns. "To" in the "To" rows indicates the destination, and "From" in the "From" columns indicates the source. The nodes N and the links L are assigned as destinations and sources.

Stored in a cell where the "From" column for one node N intersects the "To" row for one link L is a cost value of data transfer from the node N of the "From" column to the link L of the "To" row. In the first embodiment where the cost value is "100" for every link, "100" is stored as the cost value in the example of FIG. 3. Stored in a cell where the "From" column for one link L intersects the "To" row for one node N, on the other hand, is a value that indicates a coupling relation between the link L of the "From" column and the node N of the "To" row. A value "0" is stored in this cell when the link L and the node N are coupled to each other.

The link information table 300 is created from information contained in protocol packets. For instance, the relay node Nr1, which is coupled to the links Lr1, Lr2, and Lr5, transmits a protocol packet that contains, as link information, identification information of the links Lr1, Lr2, and Lr5, and the cost value "100" related to the coupling between the relay node Nr1 and the links Lr1, Lr2, and Lr5. The node N that receives a protocol packet of the relay node Nr1 therefore creates the link information table 300 from the link information contained in the protocol packet of the relay node Nr1.

<Example of Information Stored in the Route Table>

FIGS. 4A to 4C are tables showing an example of what is stored in the route table. FIG. 4A shows the route table created and held by the edge node Ne1 which is denoted by RT1. FIG. 4B shows the route table created and held by the edge node Ne2 which is denoted by RT2. FIG. 4C shows the route table created and held by the edge node Ne3 which is denoted by RT3. The route tables RT1 to RT3 are each a table that defines transfer destinations of data from the node N. The route tables RT1 to RT3 are collectively referred to as route tables RT.

The route tables RT1 to RT3 each include a destination field ("Destination"), a net mask field ("Netmask"), a hop destination field ("Next Hop"), and a priority field ("Priority"), and have an entry for each destination. A smaller value in the priority field indicates a higher priority level.

<Example of Information Stored in a Cost Management Table>

FIG. 5 is a table showing an example of what is stored in a cost management table. The cost management table, which is denoted by 500, is a table that defines a cost between the edge nodes Ne. The cost is determined by, for example, the bandwidth as in the link information table 300. A wider bandwidth means a smaller cost value. The cost management table 500 is created by the migration processing program executing module 242 of the new node Nu, and is stored in the migration management DB 244.

The cost management table 500 includes an end point field ("To") 501, a start point field ("From") 502, a total cost field ("Total Cost") 503, an ingress cost field ("Ingress") 504, a differential cost field ("Difference") 505, and a minimum cost field ("Min. Cost") 506, and has an entry for each unit of service migration, for example, for each end point edge node Ne.

The end point field 501 stores identification information (e.g., IP address or MAC address) of the edge node Ne that is the end point of a route. The start point field 501 stores identification information (e.g., IP address or MAC address) of the edge node Ne that is the start point of the route.

The total cost field 503 stores a total cost value, which is the sum of cost values in a route that does not passes through the new node Nn from the edge node Ne of the start point field 502 to the edge node Ne of the end point field 501. In the first embodiment, a total cost value between the edge nodes Ne in the network NW1 is stored in the total cost field 503. A total cost value from the edge node Ne2 to the edge node Ne1, for example, is the sum of a cost value "100" between the edge node Ne2 and the link Lr2 and a cost value "100" between the relay node Nr1 and the link Lr1, which amounts to "200".

The ingress cost field 504 stores an ingress cost value. The ingress cost value is a cost value for reaching the new node Nn from the edge node Ne of the start point field 502 in a route that passes through the new node Nn. In the first embodiment, a cost value between the edge node Ne and the new node Nn in the network NW2 is stored in the ingress cost field 504. In the case of a route which reaches the edge node Ne1 from the edge node Ne2 via the new node Nn, for example, a cost value "100" between the edge node Ne2 and the link Ln2 is the ingress cost value.

The differential field 505 stores a differential cost value. The differential cost value is a value obtained by subtracting the ingress cost value from the total cost value. The minimum cost field 506 stores a minimum cost value. The minimum cost value of an entry is the smallest value out of one or more differential cost values registered in the entry. The minimum cost value is a cost value required to carry out the migration of services to the network NW2, which is the new network, for each transfer destination.

When the new node Nn sets a cost value that is lower than a differential cost value "100" as the value of a cost C1 between the new node Nn and the edge node Ne1, data from the edge node Ne2 is transported along a path in the network NW2 that reaches the edge node Ne1 from the edge node Ne2 via the new node Nn, instead of a path in the network NW1 that reaches the edge node Ne1 from the edge node Ne2 via the relay node Nr1.

Similarly, when the new node Nn sets a cost value that is lower than a differential cost value "200" as the value of the cost C1 between the new node Nn and the edge node Ne1, data from the edge node Ne3 is transported along a path in the network NW2 that reaches the edge node Ne1 from the edge node Ne3 via the new node Nn, instead of a path in the network NW1 that reaches the edge node Ne1 from the edge node Ne3 via the relay nodes Nr2 and Nr1.

Accordingly, when the new node Nn sets a cost value that is lower than a minimum cost value "100" as the value of the cost C1 between the new node Nn and the edge node Ne1, the data from the edge node Net and the data from the edge node Ne3 are both transported along the paths in the network NW2 that reach the edge node Ne1 via the new node Nn, instead of the paths in the network NW1.

<Example of Protocol Packet Processing Steps>

Figure 6:
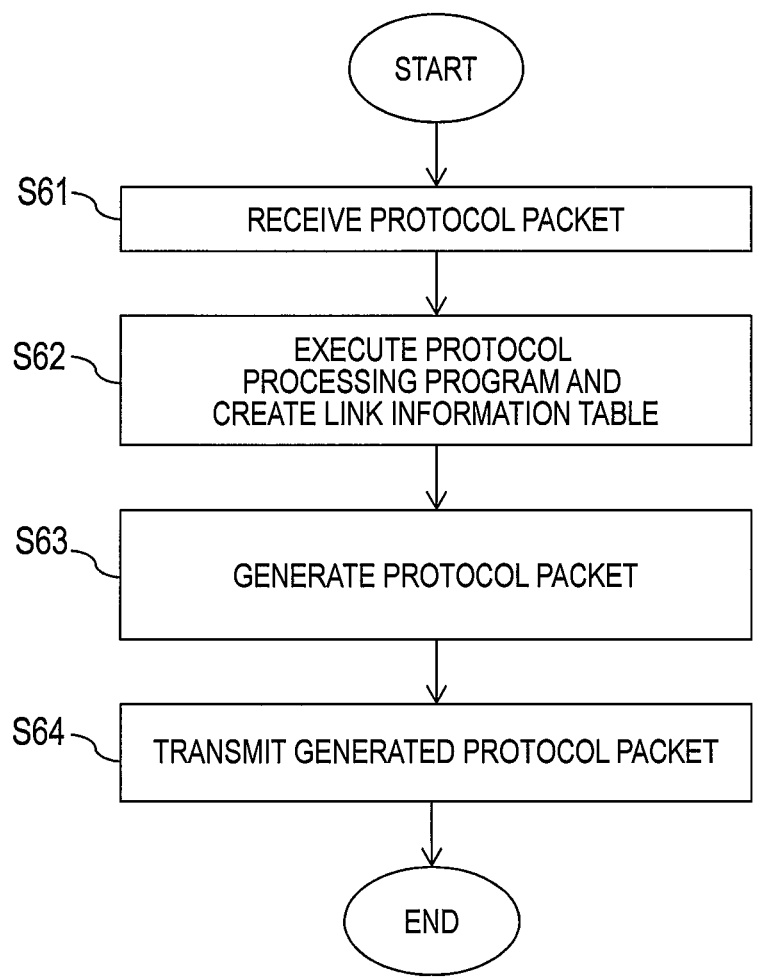
FIG. 6 is a flow chart illustrating an example of packet processing steps.

FIG. 6 is a flow chart illustrating an example of packet processing steps. One node N uses one of its interfaces 201 to receive a protocol packet from another node N (Step S61). The node N uses the separating unit 202 to identify the received packet as a protocol packet based on the header of the received packet, and uses the protocol processing program executing module 240 to execute the protocol processing program. The node N then uses link information contained in the received protocol packet to create or update the link information table 300 (Step S62).

The node N next uses the generating unit 241 to generate a protocol packet of its own node N (Step S63). The node N transmits the generated protocol packet to another node N (Step S64). The protocol packet generation (Step S63), which is triggered here by the reception of a protocol packet from another node N, may be executed at given timing.

<Example of Processing Steps of Generating the Cost Management Table 500>

Figure 7:
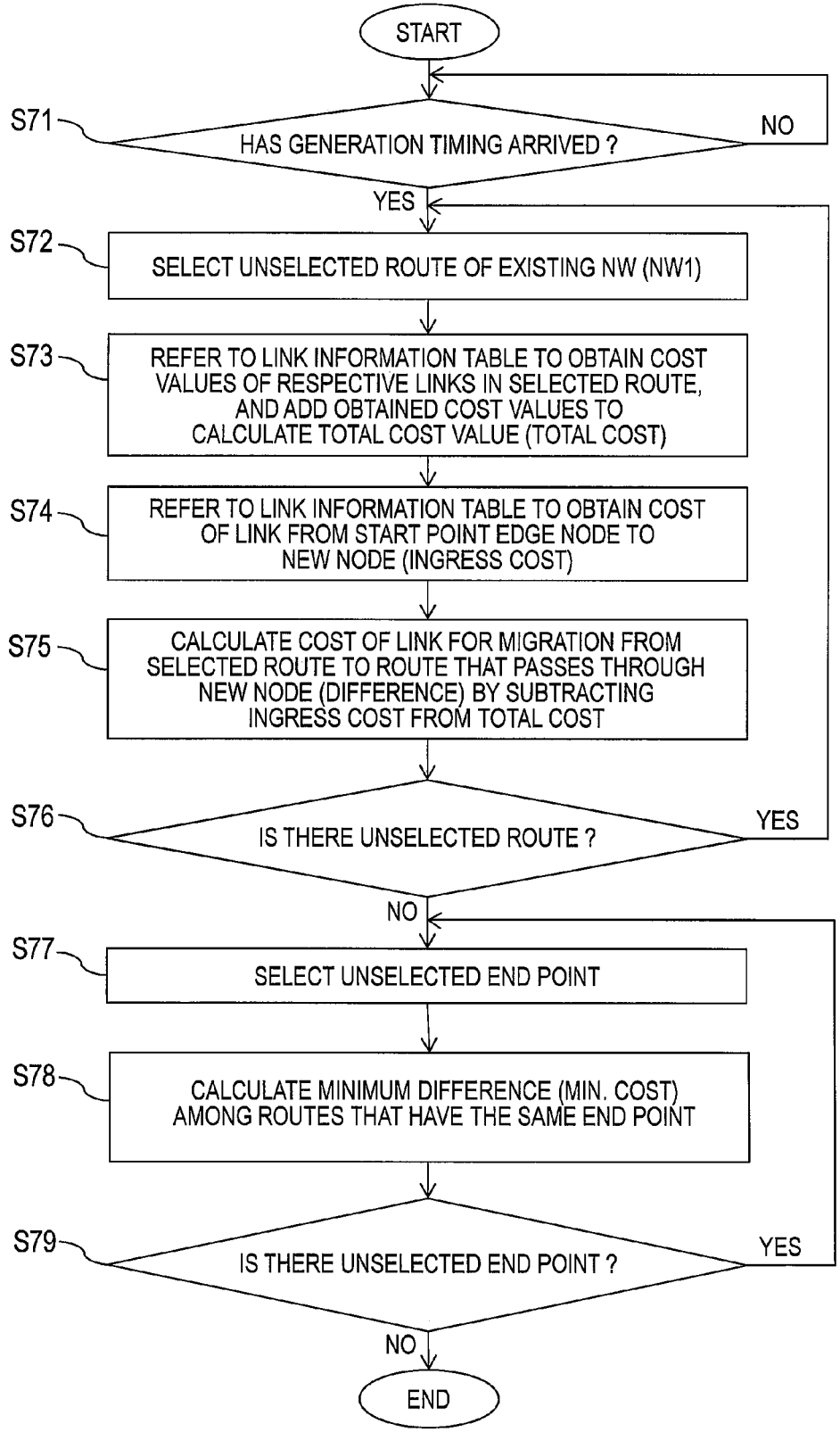
FIG. 7 is a flow chart illustrating an example of processing steps of generating the cost management table which are executed by the migration processing program executing module of the new node.

FIG. 7 is a flow chart illustrating an example of processing steps of generating the cost management table 500 which are executed by the migration processing program executing module 242 of the new node Nn. The new node Nn waits for the time to generate the cost management table 500 (Step S71: No). The generation timing may be the time when a protocol packet from another node N is received, or may be given timing.

When the generation timing arrives (Step S71: Yes), the new node Nn refers to the link information table 300 to search for a route group in the network NW1, which is the existing network where the new node Nn is not included, and selects an unselected route, which is a route that has not been selected yet, from among the route group (Step S72). No route in the route group passes through the new node Nn. In the case where the route group has been searched for at the time of creation of the route table RT, the new node NN may select an unselected route by reading the route group stored in a storage apparatus of the new node Nn. The new node Nn creates a new entry to store identification information of the start point edge node Ne of the selected route in the start point field 502, and to store identification information of the end point edge node Ne of the selected route in the end point field 501.

The new node Nn then refers to the link information table 300 to obtain costs in the selected route of Step S72, and adds the obtained costs to calculate the total cost value of the selected route (Step S73). The new node Nn stores the calculated total cost value in the total cost field 503.

The new node Nn next refers to the link information table 300 to obtain, as the ingress cost value, the cost value of the link L from the start point edge node Ne to the new node Nn (Step S74). The new node Nn stores the obtained ingress cost value in the ingress cost field 504.

The new node Nn subtracts the ingress cost value obtained in Step S74 from the total cost value calculated in Step S73, thereby calculating the differential cost value (Step S75). The new node Nn stores the calculated differential cost value in the differential field 505.

The new node Nn then determines whether or not there is any route left that has not been selected (Step S76). When there is at least one unselected route (Step S76: Yes), the new node Nn returns to Step S72 to select an unselected route. When there is no unselected route (Step S76: No), on the other hand, the new node Nn selects the end point edge node Ne that has not been selected yet from the cost management table 500 (Step S77). The new node Nn selects the smallest differential cost value out of differential cost values of routes that have the selected end point edge node Ne as the end point (Step S78). The new node Nn stores the selected differential cost value as the minimum cost value in the minimum cost field 506.

Thereafter, the new node Nn determines whether or not there is any end point edge node Ne left that has not been selected (Step S79). When there is at least one unselected end point edge node Ne (Step S79: Yes), the new node Nn returns to Step S77 to select an unselected end point edge node Ne. When there is no unselected edge point node Ne (Step S79: No), on the other hand, it means that the generation of the cost management table 500 is complete and the new node Nn ends the processing.

The activation of the processing of FIG. 7 which is executed by the migration processing program executing module 242 can be stopped by external operation. For example, in the case where one new node Nn is installed and then another new node Nn is installed for further network migration, the older new node Nn (hereinafter referred to as "previous new node Nn") now acts as one of the relay nodes Nr. The previous new node Nn is therefore set so as to stop the execution of its migration processing program. This reduces processing load on the previous new node Nn.

<Example of a Network Migration Sequence>

Figure 8:
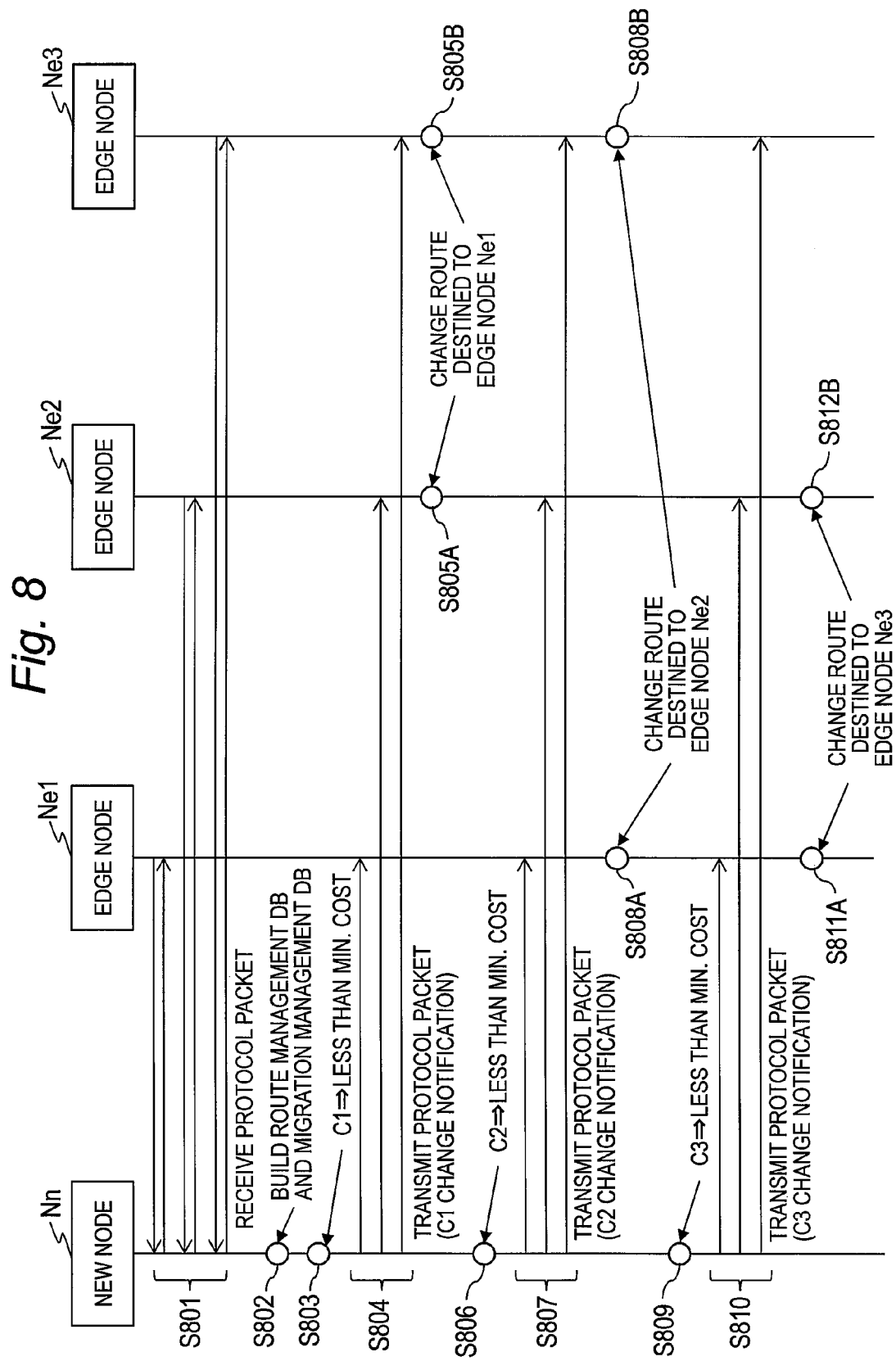
FIG. 8 is a sequence diagram illustrating an example of a network migration sequence.

FIG. 8 is a sequence diagram illustrating an example of a network migration sequence. The first embodiment discusses a migration sequence example in which the new node Nn is installed and coupled to the network NW1 for migration from the network NW1 to the network NW2. Before the new node Nn is installed, the edge nodes Ne respectively hold the route tables RT1 to RT3 which are shown in FIGS. 4A to 4C, and each hold the link information table 300.

In Step S801, the new node Nn receives a protocol packet from each edge node Ne and returns a confirmation message indicating that the protocol packet has been received to the edge node Ne.

In Step S802, the new node Nn builds the route management DB 243 and the migration management DB 244. The new node Nn now holds the thus built link information table 300, route table RT4, and cost management table 500.

FIG. 9 is a table showing an example of what is stored in the link information table 300 that is built in Step S802. FIG. 10 is a table showing an example of what is stored in the route table RT4 of the new node Nn that is built in Step S802.

In FIG. 9, "To" rows and "From" columns for the new node Nn and for the links Ln1 to Ln3 coupled to the new node Nn are added. Cost values between the new node Nn and the links Ln1 to Ln3 are "∞" at this point so that migration to a path in the network NW2 that passes through the new node Nn does not happen yet. Cost values between the edge nodes Ne1 to Ne3 and the links Ln1 to Ln3 are "100" as illustrated in FIG. 1.

Referring back to FIG. 8, in Step S803, the new node Nn first sets the cost value C1 between the new node Nn and the link Ln1. To give a concrete example, the new node Nn identifies an entry of the cost management table 500 where the end point field 501 holds the edge node Ne1 to which the link Ln1 is coupled. The new node Nn obtains a value "100" of the minimum cost field 506 from the identified entry. The new node Nn stores, as the cost value C1, a value less than the obtained minimum cost value "100" (in this example, "50") in a cell of the link information table 300 where the "From" column for the new node Nn intersects the "To" row for the link Ln1. The cost value C1 is not limited to "50" and can be any value less than the minimum cost value.

FIG. 11 is a table showing an example of what is stored in the link information table 300 after the update in Step S803.

In Step S804, the new node Nn uses the updated link information table 300 of FIG. 11 to generate a protocol packet related to the new node Nn, and notifies the protocol packet to the edge nodes Ne1 to Ne3. This protocol packet contains the cost value C1 between the new node Nn and the link Ln1. The link information table 300 is updated to the state of FIG. 11 by this notification in each of the edge nodes Ne1 to Ne3.

In Step S805A, the edge node Ne2 executes a minimum-cost search in the link information table 300 updated with the use of link information that is contained in the protocol packet from the new node Nn. Specifically, the edge node Ne2 searches for, for example, a route to the edge node Ne1 that has the smallest total cost value by referring to the link information table 300. The route that has the smallest total cost value in this case is a route that passes through the new node Nn, and the edge node Ne2 therefore updates the route table RT2.

To give a concrete example, the edge node Ne2 identifies an entry of the route table that holds in the destination field a network of the user node Nu1 to which the edge node Ne1 coupled to the link Ln1 where the cost value C1 is set is coupled. In the identified entry, the edge node Ne2 adds the new node Nn to the hop destination field and adds a priority level higher than any existing priority level to the priority field.

FIG. 12A is a table showing an example of what is stored in the route table RT2 after the update in Step S805A. In this example, a priority level "15", which is higher than a priority level "20" of the relay node Nr1 as a hop destination registered in the hop destination field and a priority level "30" of the relay node Nr2 as a hop destination registered in the hop destination field, is set as the priority level of the new node Nn as a hop destination registered in the hop destination field. The priority level of the new node Nn may take any value that is smaller than existing priority level values (namely, higher priority). The route table RT2 of FIG. 4B is thus updated as shown in FIG. 12A.

FIG. 12B is a table showing an example of what is stored in the route table RT3 after the update in Step S805B. In Step S805B, the edge node Ne3 similarly executes a minimum-cost search in the link information table 300 updated with the use of the link information that is contained in the protocol packet from the new node Nn, and updates the route table RT3. The route table RT3 of FIG. 4C is thus updated as shown in FIG. 12B.

FIG. 12C is a table showing an example of what is stored in the route table RT4 after the update in Step S805B. In Step S805B, the new node Nn also updates the route table RT4. At this point, the link Ln1 alone is the processing target and all values in the hop destination field are therefore "edge node Ne1". A smaller value is set in the priority field for a route to the destination that has a lower cost value. The route table RT4 of FIG. 10 is thus updated as shown in FIG. 12C.

Referring back to FIG. 8, in Step S806, the new node Nn sets the cost value C2 between the new node Nn and the link Ln2. To give a concrete example, the new node Nn identifies an entry of the cost management table 500 where the end point field 501 holds the edge node Ne2 to which the link Ln2 is coupled. The new node Nn obtains a value "100" of the minimum cost field 506 from the identified entry. The new node Nn stores, as the cost value C2, a value less than the obtained minimum cost value "100" (in this example, "50") in a cell of the link information table 300 where the "From" column for the new node Nn intersects the "To" row for the link Ln2. The cost value C2 is also not limited to "50" and can be any value less than the minimum cost value.

FIG. 13 is a table showing an example of what is stored in the link information table 300 after the update in Step S806.

In Step S807, the new node Nn uses the updated link information table 300 of FIG. 13 to generate a protocol packet related to the new node Nn, and notifies the protocol packet to the edge nodes Ne1 to Ne3. This protocol packet contains the cost value C2 between the new node Nn and the link Ln2. The link information table 300 is updated to the state of FIG. 13 by this notification in each of the edge nodes Ne1 to Ne3.

In Step S808A, the edge node Ne1 executes a minimum-cost search in the link information table 300 updated with the use of link information that is contained in the protocol packet from the new node Nn. Specifically, the edge node Ne1 searches for, for example, a route to the edge node Ne2 that has the smallest total cost value by referring to the link information table 300. The route that has the smallest total cost value in this case is a route that passes through the new node Nn, and the edge node Ne1 therefore updates the route table RT1.

To give a concrete example, the edge node Ne1 identifies an entry of the route table that holds in the destination field a network of the user node Nu2 to which the edge node Ne2 coupled to the link Ln2 where the cost value C2 is set is coupled. In the identified entry, the edge node Ne1 adds the new node Nn to the hop destination field and adds a priority level higher than any existing priority level to the priority field.

FIG. 14A is a table showing an example of what is stored in the route table RT1 after the update in Step S808A. In this example, a priority level "15", which is higher than a priority level "20" of the relay node Nr1 as a hop destination registered in the hop destination field, is set as the priority level of the new node Nn as a hop destination registered in the hop destination field. The route table RT1 of FIG. 4A is thus updated as shown in FIG. 14A.

FIG. 14B is a table showing an example of what is stored in the route table RT3 after the update in Step S808B. In Step S808B, the edge node Ne3 similarly executes a minimum-cost search in the link information table 300 updated with the use of the link information that is contained in the protocol packet from the new node Nn, and updates the route table RT3. The route table RT3 of FIG. 12B is thus updated as shown in FIG. 14B.

FIG. 14C is a table showing an example of what is stored in the route table RT4 after the update in Step S808B. In Step S808B, the new node Nn also updates the route table RT4. At this point, the links Ln1 and Ln2 are the processing targets and "edge node Ne2" is therefore added as values in the hop destination field. A smaller value is set in the priority field for a route to the destination that has a lower cost value. The route table RT4 of FIG. 12C is thus updated as shown in FIG. 14C.

Referring back to FIG. 8, in Step S809, the new node Nn sets the cost value C3 between the new node Nn and the link Ln3. To give a concrete example, the new node Nn identifies an entry of the cost management table 500 where the end point field 501 holds the edge node Ne3 to which the link Ln3 is coupled. The new node Nn obtains a value "100" of the minimum cost field 506 from the identified entry. The new node Nn stores, as the cost value C3, a value less than the obtained minimum cost value "100" (in this example, "50") in a cell of the link information table 300 where the "From" column for the new node Nn intersects the "To" row for the link Ln3. The cost value C3 is also not limited to "50" and can be any value less than the minimum cost value.

FIG. 15 is a table showing an example of what is stored in the link information table 300 after the update in Step S809.

In Step S810, the new node Nn uses the updated link information table 300 of FIG. 15 to generate a protocol packet related to the new node Nn, and notifies the protocol packet to the edge nodes Ne1 to Ne3. This protocol packet contains the cost value C3 between the new node Nn and the link Ln3. The link information table 300 is updated to the state of FIG. 15 by this notification in each of the edge nodes Ne1 to Ne3.

In Step S811A, the edge node Ne1 executes a minimum-cost search in the link information table 300 updated with the use of link information that is contained in the protocol packet from the new node Nn. Specifically, the edge node Ne1 searches for, for example, a route to the edge node Ne3 that has the smallest total cost value by referring to the link information table 300. The route that has the smallest total cost value in this case is a route that passes through the new node Nn, and the edge node Ne1 therefore updates the route table RT1.

To give a concrete example, the edge node Ne1 identifies an entry of the route table that holds in the destination field a network of the user node Nu3 to which the edge node Ne3 coupled to the link Ln3 where the cost value C3 is set is coupled. In the identified entry, the edge node Ne1 adds the new node Nn to the hop destination field and adds a priority level higher than any existing priority level to the priority field.

FIG. 16A is a table showing an example of what is stored in the route table after the update in Step S811A. In this example, a priority level "15", which is higher than a priority level "30" of the relay node Nr1 as a hop destination registered in the hop destination field, is set as the priority level of the new node Nn as a hop destination registered in the hop destination field. The priority level of the new node Nn may take any value that is smaller than the existing priority level values (namely, higher priority). The route table RT1 of FIG. 14A is thus updated as shown in FIG. 16A.

FIG. 16B is a table showing an example of what is stored in the route table after the update in Step S811B. In Step S811B, the edge node Ne2 similarly executes a minimum-cost search in the link information table 300 updated with the use of the link information that is contained in the protocol packet from the new node Nn, and updates the route table RT2. The route table RT2 of FIG. 12A is thus updated as shown in FIG. 16B.

FIG. 16C is a table showing an example of what is stored in the route table RT4 after the update in Step S811B. In Step S811B, the new node Nn also updates the route table RT4. At this point, the links Ln1 to Ln3 are the processing targets and "edge node Ne3" is therefore added as values in the hop destination field. A smaller value is set in the priority field for a route to the destination that has a lower cost value. The route table RT4 of FIG. 14C is thus updated as shown in FIG. 16C.

As described above, according to the first embodiment, the new network NW2 is built by adding the new node Nn to the existing network NW1 so that the network NW1 and the network NW2 are both present. In this state, the cost C1, the cost C2, and the cost C3 are set sequentially, thereby executing the migration of routes destined to the edge node Ne1, the edge node Ne2, and the edge node Ne3 for transportation between edge nodes from routes in the network NW1 to routes in the network NW2 which pass through the new node. Thereafter, the relay nodes of the network NW1 which is no longer used are removed. Network migration can thus be executed in stages.

In addition, because the new node Nn manages costs and notifies costs to the edge nodes Ne, each edge node Ne only needs to update the link information table 300 and the route table in the usual manner to accomplish network migration in stages. This reduces the load of controlling networks that is incurred by service migration, and network migration can be carried out smoothly.

Second Embodiment

A second embodiment of this invention describes a mode in which a part of each node N is separated from the rest. The nodes N in the first embodiment are configured as illustrated in FIG. 2. In the second embodiment, the protocol processing units 204 included in the respective nodes N in the first embodiment are extracted from the nodes N to constitute one protocol processing server, thereby giving the nodes N of the second embodiment a configuration that does not include a protocol processing unit. The protocol processing server and the nodes N are coupled to each other in a manner that allows communication between the server and the nodes. The description of the second embodiment focuses on differences from the first embodiment. In the second embodiment, components that are the same as those in the first embodiment are denoted by the same reference symbols, and descriptions thereof are omitted.

Figure 17:
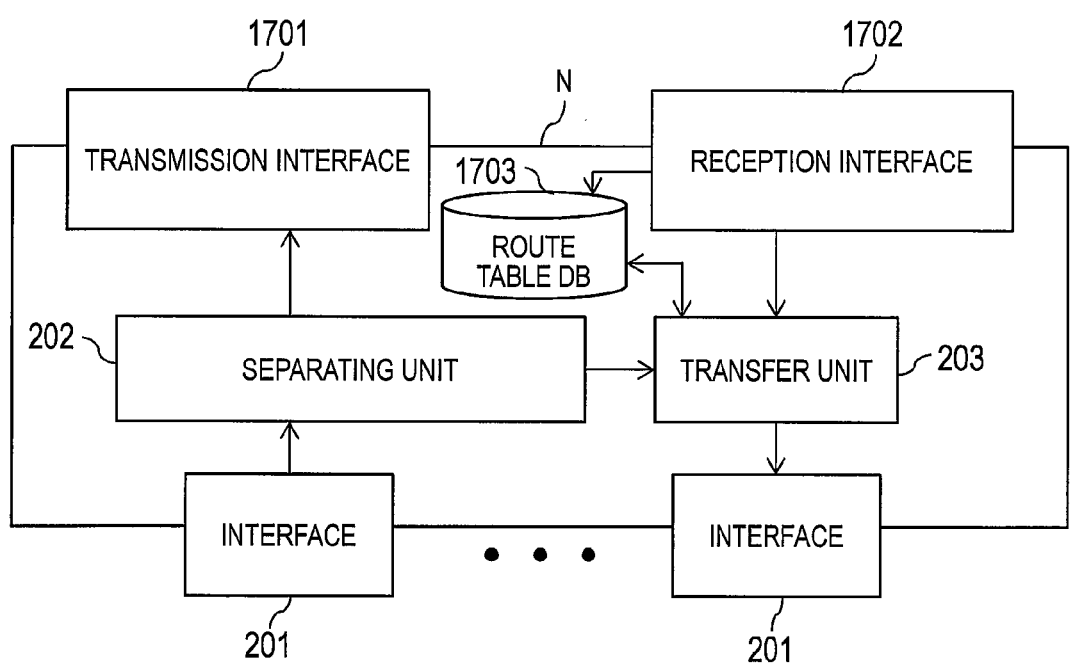
FIG. 17 is a block diagram illustrating a configuration example of each node according to the second embodiment.

FIG. 17 is a block diagram illustrating a configuration example of each node N according to the second embodiment. Each node N includes the interfaces 201, the separating unit 202, the transfer unit 203, a transmission interface 1701, a reception interface 1702, and a route table DB 1703.

The transmission interface 1701 transmits to the protocol processing server a packet that is determined by the separating unit 202 as a protocol packet. The reception interface 1702 receives a protocol packet from the protocol processing server and outputs the received packet to the transfer unit 203. The reception interface 1702 also receives the route table RT (one of RT1, RT2, RT3, and RT4) delivered from the protocol processing server and stores the received table in the route table DB 1703.

Figure 18:
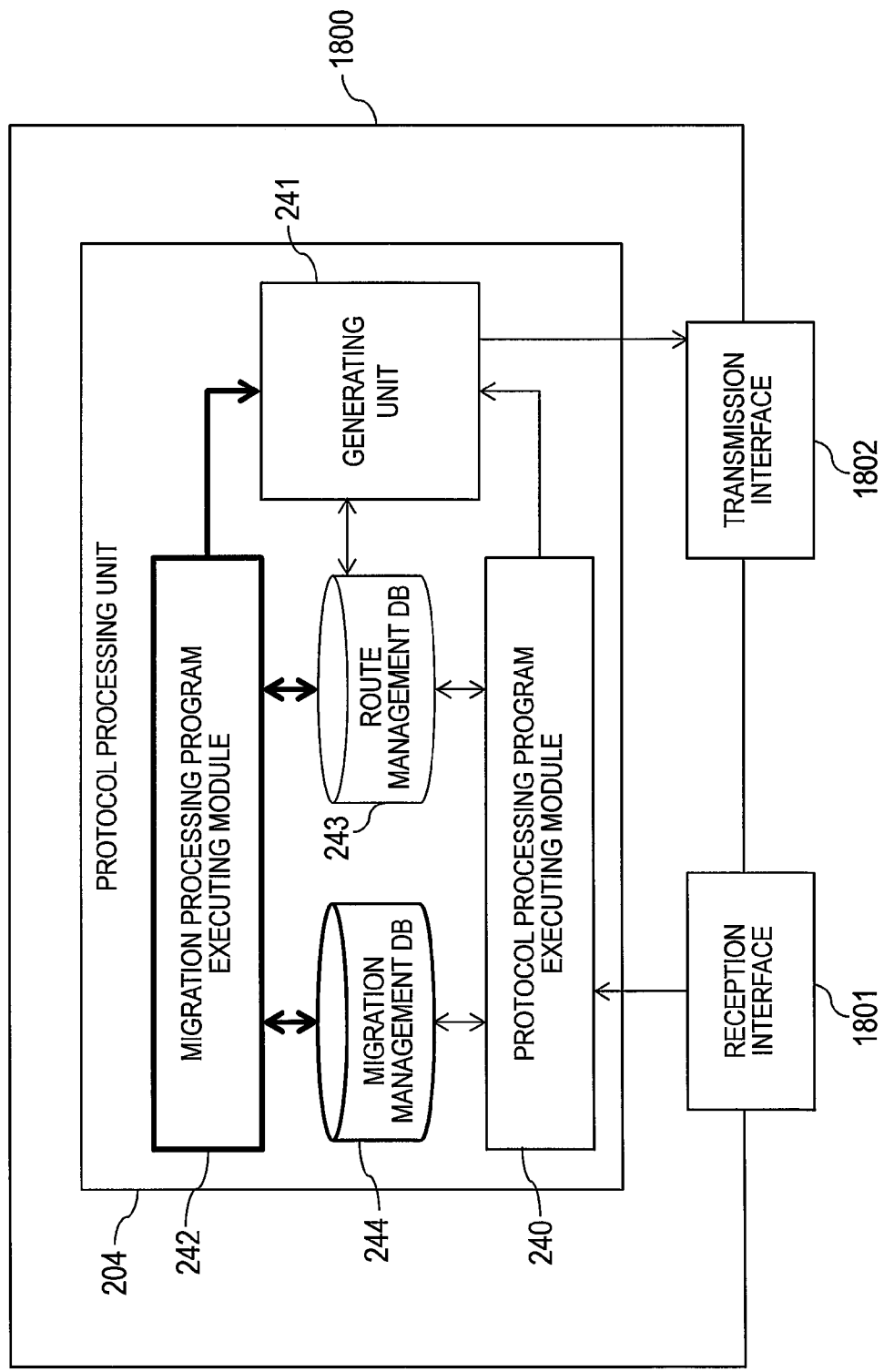
FIG. 18 is a block diagram illustrating a configuration example of the protocol processing server.

FIG. 18 is a block diagram illustrating a configuration example of the protocol processing server. The protocol processing server, which is denoted by 1800, includes a reception interface 1801 and a transmission interface 1802 in addition to the protocol processing unit 204.

The reception interface 1801 receives protocol packets from the nodes N and transfers the received packets to the protocol processing unit 204. The transmission interface 1802 receives a protocol packet from the protocol processing unit 204 and transmits the received packet to the nodes N.

The protocol processing server 1800 creates the route tables RT of the respective nodes N and respectively delivers the route tables RT to the nodes N. The link information table 300 and the cost management table 500 are managed by the protocol processing server 1800 in a centralized manner.

According to the second embodiment, where none of the nodes N include the protocol processing unit 204, the number of parts of each node N is reduced. In addition, with the protocol processing server 1800 managing protocol processing and migration processing in a centralized manner, processing load on each node is lessened.

Third Embodiment

A third embodiment of this invention deals with an example in which the cost management table 500 according to the first embodiment and the second embodiment further includes band information. The band information is information that includes a logical bandwidth used by a label-switched path (LPS) and the priority level of the LSP. The description of the third embodiment focuses on differences from the first embodiment and the second embodiment. In the third embodiment, components that are the same as those in the first embodiment and the second embodiment are denoted by the same reference symbols, and descriptions thereof are omitted.

FIG. 19 is a table showing an example of what is stored in the cost management table 500 according to the third embodiment. The cost management table 500 includes, in addition to the information shown in FIG. 5, an LSP field ("LSP") 1901, a used bandwidth field ("Bandwidth") 1902, and a priority field ("Priority") 1903 as fields for storing the band information.

The LSP field 1901 stores identification information of an LSP. The same combination of the start point edge node Ne and the end point edge node Ne is found in one or more LSPs. In the case of the combination of the start point edge node Ne2 and the end point edge node Ne1, LSP1 and LSP2 are built.

The used bandwidth filed 1902 stores a bandwidth used by an LSP in question. The priority field 1903 stores the priority level of the LSP. Here, the priority level of an LSP is higher when the numerical value of the priority field 1903 is larger. The values of the LSP field 1901, the used bandwidth field 1902, and the priority field 1903 are set manually.

The values of the LSP field 1901, the used bandwidth field 1902, and the priority field 1903 are used in migration processing. For example, while migration processing is executed in the order of link number Ln# in the migration sequence of the first embodiment which is illustrated in FIG. 8, migration processing of the third embodiment is executed starting from LSPs that can be accommodated in used bandwidths that are set and that are high in priority. Network migration can thus be executed efficiently in stages.

Fourth Embodiment

A fourth embodiment of this invention deals with an example of the migration of a network that is divided into areas. A boundary node Nb# is installed at each boundary between areas. The boundary nodes Nb# are collectively referred to as boundary nodes Nb. The boundary nodes Nb have the same configuration as that of the nodes N in the first embodiment and the third embodiment. The description of the fourth embodiment focuses on differences from the first embodiment to the third embodiment. In the fourth embodiment, components that are the same as those in the first embodiment to the third embodiment are denoted by the same reference symbols, and descriptions thereof are omitted.

Figure 20:
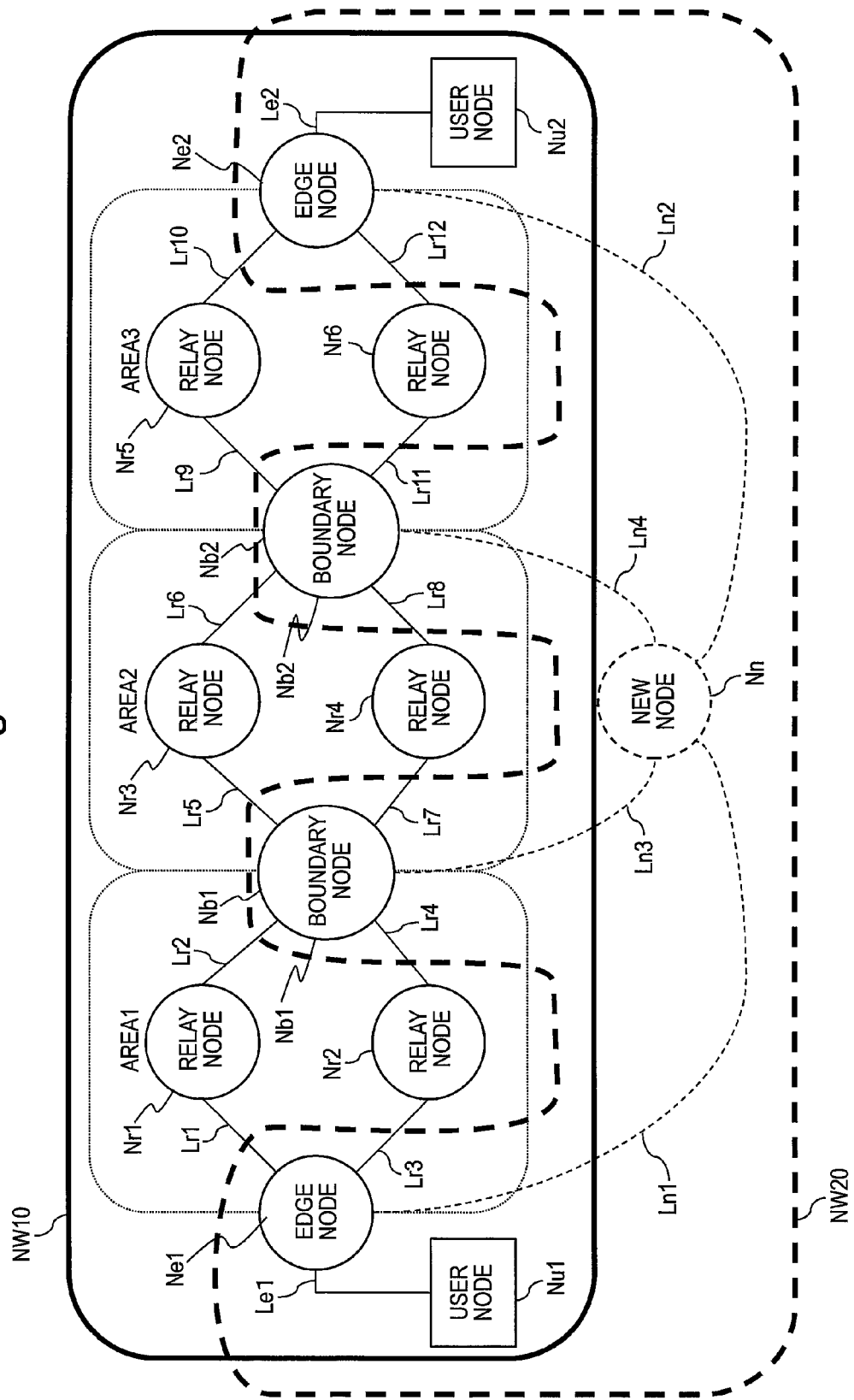
FIG. 20 is an explanatory diagram illustrating a system configuration example of a communication system according to the fourth embodiment.

FIG. 20 is an explanatory diagram illustrating a system configuration example of a communication system according to the fourth embodiment. The communication system is a system in which a plurality of nodes N including the boundary nodes Nb are coupled in a manner that allows communication to and from one another, and constitutes a network NW10. In the example of FIG. 20, an edge node Ne1, relay nodes Nr1 and Nr2, and a boundary node Nb1 belong to an area 1, the boundary node Nb1, relay nodes Nr3 and Nr4, and a boundary node Nb2 belong to an area 2, and the boundary node Nb2, relay nodes Nr5 and Nr6, and an edge node Ne2 belong to an area 3.

FIG. 21 is a table showing an example of what is stored in the cost management table 500 according to the fourth embodiment. In the fourth embodiment, an area field ("Area") 2100 is added to the cost management table 500. The area field 2100 stores an area number. The area number is identification information that indicates an area to which a combination of a start point node and an end point node in question belongs. Routes that have the same end point node but different area numbers are registered in different entries, and a minimum cost is accordingly set on an area-by-area basis.

The new node Nn in the fourth embodiment is coupled to the network NW10 by links Ln1 to Ln4. The new node Nn migrates from the network NW10 to a network NW20 following the steps of the migration processing described in the first embodiment. Dividing a communication network into areas is employed in order to reduce the load of controlling the communication network when the communication network is large in scale. Network migration can be carried out in this manner also in a communication network that is divided into areas. In addition, in the case where network migration is to be executed only for the area 1, for example, the new node Nn and the network NW10 are coupled by using only the link Ln1 and the link Ln3. The fourth embodiment thus makes area-by-area network migration possible. Further, when all areas to which the boundary nodes Nb belong finish network migration, there are no longer services that are provided through the boundary nodes Nb, and the boundary nodes Nb can therefore be removed as well.

While the embodiments described above deal with examples in which the new node Nn is coupled to the edge nodes Ne and the boundary nodes Nb via the links Ln, nodes to which the new node Nn is directly coupled may be the user nodes Nu or the relay nodes Nr. In the case where the new node Nn is coupled directly to the user nodes Nn, the edge nodes Ne in addition to the relay nodes Nr can be removed after migration to the network NW2.

In the case where the new node Nn is coupled directly to the relay nodes Nr, the ingress cost is the total cost of a target route from the source edge node Ne to the new node Nn via the relay node Nr to which the new node Nn is coupled.

A case in which the network configuration of FIG. 1 does not include the link Lr5 and the link Ln3 is coupled to the relay node Nr2 instead of the edge node Ne3 is discussed as an example. In this case, the total cost of a route in the network NW1 that starts from the edge node Ne3 and reaches the edge node Ne1 via the relay node Nr2, the edge node Ne2, and the relay node Nr1 is "400". The ingress cost of a route that starts from the edge node Ne3 and reaches the edge node Ne1 via the new node Nn, on the other hand, is "200", which is the sum of a cost value "100" between the edge node Ne3 and the link Lr4 and a cost value "100" between the relay node Nr2 and the link Ln3, which couples the relay node Nr2 and the new node Nn.

While the embodiments described above deal with example in which the new node Nn is installed, a new network including a plurality of new nodes may be installed as one virtual new node. In this case, the cost of each new node in the new network is set to, for example, "0". Redundant routes in the new network can be controlled without differentiating in cost by employing Software-Defined Networking (SDN) within the new network.

In the embodiments described above, a smaller value is set as a cost between one node N and one link L when the link L has a wider bandwidth. A larger value may instead be set as the cost for a wider bandwidth in the case where a route that requires a maximum cost is searched for in a route search. In this case, the largest cost value instead of the smallest cost value is selected out of differential costs, and the costs C1 to C3 of the new node Nn are each set to a value greater than the maximum cost. In any case, it is only necessary to set the new node Nn to a cost value that causes the source edge node Ne to select a route that passes through the new node Nn. The cost value which is determined by the bandwidth in the embodiments described above may be determined by other factors than the bandwidth, such as a transfer delay necessary for a service or jitters.

It should be noted that this invention is not limited to the above-mentioned embodiments, and encompasses various modification examples and the equivalent configurations within the scope of the appended claims without departing from the gist of this invention. For example, the above-mentioned embodiments are described in detail for a better understanding of this invention, and this invention is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:

1. A transfer apparatus to be coupled to a first network having a configuration in which a cost required for data transfer is set to each of lines coupling the transfer apparatus to other transfer apparatuses, and data is transferred along a route that has been set, the transfer apparatus comprising:

a processor;
one or more interfaces coupled to the processor that receives and transmits data packets; and
a memory coupled to the processor,
wherein the memory stores:
a line information table, defining a coupling relationship of the lines and a cost value for data transfer between the transfer apparatus and the other transfer apparatuses using a respective line, the cost value indicating a priority level at which a line is used for data transfer;
a route table that indicates other transfer apparatuses in a route and indicates respective priorities of each of the other transfer apparatuses stored in the route table,
a cost management table that indicates a cost value between each of the transfer apparatuses based on the respective cost values for data transfer using respective lines, and
instructions that when executed by the processor, cause the processor to:
calculate a total cost of a first route in the first network that starts from a source transfer apparatus and ends at a destination transfer apparatus of the transfer apparatuses and does not include the transfer apparatus, based on the respective cost values for data transfer using respective lines between the source transfer apparatus and the destination transfer apparatus and store the total cost in the cost management table;
obtain a particular cost, the particular cost being a cost between the source transfer apparatus and a first line, which couples the source transfer apparatus and the transfer apparatus in a second route, which starts from the source transfer apparatus and reaches the destination transfer apparatus via the transfer apparatus based on the respective cost values for data transfer using respective lines of the second route, including the first line, and store the particular cost in the cost management table;
calculate a difference between the total cost and the particular cost and store the difference in the cost management table;
refer to the cost management table and obtain a reference cost value based on the difference;
determine a second line cost value of a second line of the second route, which couples the transfer apparatus and the destination transfer apparatus, that is less than the reference cost value,
store the second line cost in the line information table,
notify the second line cost value to the source transfer apparatus;
receive data packets via the one or more interfaces; and
transmit data packets via the one or more interfaces according to one of the other transfer apparatuses in the route table having the highest priority.

2. The transfer apparatus according to claim 1, wherein the cost value indicating a priority level of a line used for data transfer is based on a bandwidth of the line.

3. The transfer apparatus according to claim 1, wherein the memory further stores instructions that when executed by the processor cause the processor to determine the second line cost value of the second line that is less than the reference cost value and that causes the source transfer apparatus to transfer data according to the second route.

4. A server configured to communicate to and from a particular transfer apparatus to be coupled to a first network having a configuration in which a cost required for data transfer is set to each of lines coupling the particular transfer apparatus to other transfer apparatuses, and data is transferred along a route that has been set, the server comprising:

a processor;
a processor;
one or more interfaces coupled to the processor that receives and transmits data packets; and
a memory coupled to the processor,
wherein the memory stores:
a line information table, defining a coupling relationship of the lines and a cost value for data transfer between the particular transfer apparatus and the other transfer apparatuses using a respective line, the cost value indicating a priority level at which a line is used for data transfer;
a route table that indicates other transfer apparatuses in a route and indicates respective priorities of each of the other transfer apparatuses stored in the route table,
a cost management table that indicates a cost value between each of the transfer apparatuses based on the respective cost values for data transfer using respective lines, and
instructions that when executed by the processor, cause the processor to:
calculate a total cost of a first route in the first network that starts from a source transfer apparatus and ends at a destination transfer apparatus of the transfer apparatuses and does not include the transfer apparatus, based on the respective cost values for data transfer using respective lines between the source transfer apparatus and the destination transfer apparatus and store the total cost in the cost management table;
obtain a particular cost, the particular cost being a cost between the source transfer apparatus and a first line, which couples the source transfer apparatus and the particular transfer apparatus in a second route, which starts from the source transfer apparatus and reaches the destination transfer apparatus via the particular transfer apparatus based on the respective cost values for data transfer using respective lines of the second route, including the first line, and store the particular cost in the cost management table;
calculate a difference between the total cost and the particular cost and store the difference in the cost management table; and
refer to the cost management table and obtain a reference cost value based on the difference;
determine a second line cost value of a second line of the second route, which couples the transfer apparatus and the destination transfer apparatus, that is less than the reference cost value,
store the second line cost in the line information table
notify the second line cost value to the source transfer apparatus;
receive data packets via the one or more interfaces; and
transmit data packets via the one or more interfaces according to one of the other transfer apparatuses in the route table having the highest priority.

5. The server according to claim 4, wherein the cost value indicating a priority level of a line used for data transfers is based on a bandwidth of the line.

6. The server according to claim 4, wherein the memory further stores instructions that when executed by the processor cause the processor to determine the second line cost value of the second line that is less than the reference cost value and that causes the source transfer apparatus to transfer data according to the second route.

7. A route changing method executed by a transfer apparatus to be coupled to a first network having a configuration in which a cost required for data transfer is set to each of lines coupling the transfer apparatus to other transfer apparatuses, and data is transferred along a route that has been set,
the transfer apparatus comprising:
a processor;
one or more interfaces coupled to the processor that receives and transmits data packets;
a memory coupled to the processor,
wherein the memory stores:
a line information table, defining a coupling relationship of the lines and a cost value for data transfer between the transfer apparatus and the other transfer apparatuses using a respective line, the cost value indicating a priority level at which a line is used for data transfer;
a route table that indicates other transfer apparatuses in a route and indicates respective priorities of each of the other transfer apparatuses stored in the route table, and
a cost management table that indicates a cost value between each of the transfer apparatuses based on the respective cost values for data transfer using respective lines,
the route changing method, executed, by the processor, comprising:
calculating a total cost of a first route in the first network that starts from a source transfer apparatus and ends at a destination transfer apparatus of the transfer apparatuses and does not include the transfer apparatus, based on the respective cost values for data transfer using respective lines between the source transfer apparatus and the destination transfer apparatus and store the total cost in the cost management table;
obtaining a particular cost, the particular cost being a cost between the source transfer apparatus and a first line, which couples the source transfer apparatus and the transfer apparatus in a second route, which starts from the source transfer apparatus and reaches the destination transfer apparatus via the transfer apparatus based on the respective cost values for data transfer using respective lines of the second route, including the first line, and store the particular cost in the cost management table;
calculating a difference between the total cost calculated and the particular cost and storing the difference in the cost management table;
referring to the cost management table and obtain a reference cost value based on the difference calculated in the second calculation processing;
determining a second line cost value of a second line of the second route, which couples the transfer apparatus and the destination transfer apparatus, that is less than the reference cost value;
storing the second line cost in the line information table
notifying the second line cost value to the source transfer apparatus;
receiving data packets via the one or more interfaces; and
transmitting data packets via the one or more interfaces according to one of the other transfer apparatuses in the route table having the highest priority.

8. The route changing method according to claim 7, wherein the cost value indicating a priority level of a line used for data transfers based on a bandwidth of the line.

9. The route changing method according to claim 7, further comprising the steps of: determining the second line cost value of the second line that is less than the reference cost value and that causes the source transfer apparatus to transfer data according to the second route.

* * * * *